United States Patent [19]

Bernard et al.

[11] 4,159,927

[45] * Jul. 3, 1979

[54] ANODIZING ALUMINUM IN BORIC ACID BATH CONTAINING HYDROXY ORGANIC ACID

[75] Inventors: Walter J. Bernard; John J. Randall, Jr., both of Williamstown, Mass.

[73] Assignee: Sprague Electric Company, North Adams, Mass.

[*] Notice: The portion of the term of this patent subsequent to Sep. 12, 1995, has been disclaimed.

[21] Appl. No.: 810,130

[22] Filed: Jun. 27, 1977

[51] Int. Cl.² ............... C25D 11/10; C25D 11/08
[52] U.S. Cl. .................................................. 204/58
[58] Field of Search .......................................... 204/58

[56] References Cited

U.S. PATENT DOCUMENTS

| | | | |
|---|---|---|---|
| 1,266,557 | 5/1918 | Coulson | 204/58 X |
| 1,412,514 | 4/1922 | Coulson | 204/58 |
| 2,262,967 | 11/1941 | Schenk | 204/58 |
| 3,682,790 | 8/1972 | Orth et al. | 204/58 |
| 3,844,908 | 10/1974 | Matsuo et al. | 204/35 N |
| 3,935,084 | 1/1976 | Terai et al. | 204/58 |
| 4,113,579 | 9/1978 | Randall et al. | 204/33 |

FOREIGN PATENT DOCUMENTS 1114937 10/1961 Fed. Rep. of Germany.

Primary Examiner—F. C. Edmundson
Attorney, Agent, or Firm—Connolly and Hutz

[57] ABSTRACT

A dielectric oxide film is modified by the incorporation of a minor amount of carbonaceous material. The modified film is produced by anodizing an aluminum electrolytic capacitor anode in a conventional electrolyte containing a minor amount of an alpha- or ortho- hydroxy carboxylic acid or salt.

9 Claims, 1 Drawing Figure

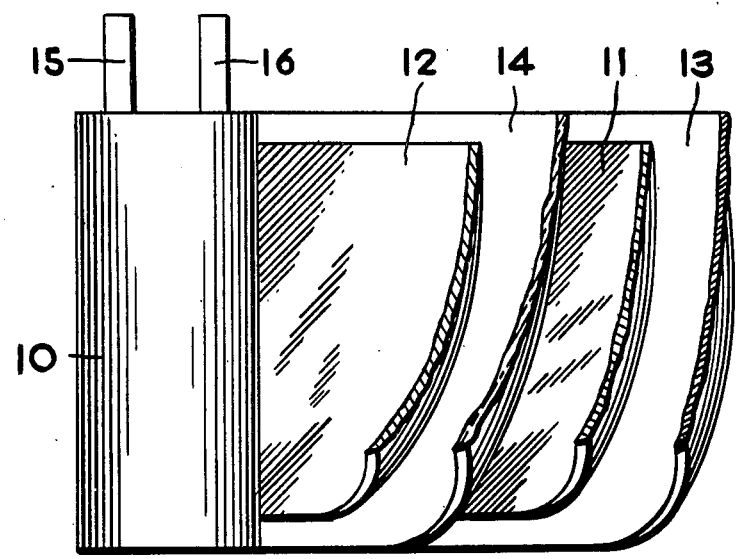

ANODIZING ALUMINUM IN BORIC ACID BATH CONTAINING HYDROXY ORGANIC ACID

BACKGROUND OF THE INVENTION

This invention relates to a modified dielectric oxide film on the surface of an aluminum electrolytic capacitor anode. More particularly, it relates to a dielectric oxide film stabilized by the incorporation of a minor amount of a carbonaceous material. The invention permits the utilization of aluminum foils which have a very fine etch structure, as anodes in capacitors.

Anodized aluminum anodes enjoy widespread use in electrolytic capacitors. One problem associated with them is the degradation of the anhydrous aluminum oxide dielectric by moisture resulting in hydration of the dielectric which produces a conductive layer and an increase in the equivalent series resistance (ESR) of the capacitor. Since it is quite difficult to maintain perfectly anhydrous conditions, one solution to this problem has been to produce a hydrated surface to protect the underlying oxide layer to prevent such degradation, particularly in use in the final capacitor.

With the production of a finer etch structure on aluminum foils, deliberate hydration must be limited. The largest part of the available surface area in these finely etched foils is in the form of long, narrow channels or tubes running beneath the foil surface; excess hydrous oxide plugs these channels with the result that portions become inaccessible to the working electrolyte of the capacitor.

It has been possible to remove this unwanted hydrous oxide from the surface of the films by various treatments during manufacture. For example, a process patented by Alwitt (U.S. Pat. No. 3,733,291 issued May 15, 1973) involves stripping away any hydrated oxide that remains after anodization, and our copending application (Ser. No. 791,656 filed April 28, 1977) involves inhibiting hydration during and subsequent to depolarization while even dissolving some of the unwanted hydrous oxide present. The first process primarily affects the surface of the foil, while the second process does work throughout the pore structure. However, neither of these appear to modify the film by incorporation of material into it.

The presence of heavy hydrous oxide layers is troublesome in the formation of high voltage foils, as at higher voltage the barrier oxide layer formed is thicker and tends to clog the etch tunnels. In order to keep the thickness of total layer (oxide plus hydrate) as low as possible, it is desirable to minimize hydrate formation.

While the additives of the present invention have been used as solutes in formation electrolytes, the resulting dielectric oxide films have not been as satisfactory as those produced in conventional boric acid/borate formation electrolytes. Some working electrolytes also contain these additives; again, the action is a surface one without modifying the oxide layer.

It has been recognized that material from a formation electrolyte can be incorporated into the dielectric oxide layer during anodization. This has been described in the technical literature including a paper by J. J. Randall, Jr., W. J. Bernard, and R. R. Wilkinson published in *Electrochimica Acta* 10: 183–201(1965), and another paper by J. J. Randall, Jr., and W. J. Bernard published in *Electrochimica Acta* 20: 653–61(1975).

SUMMARY OF THE INVENTION

It is an object of the invention to provide a modified dielectric oxide film on an aluminum anode for an electrolytic capacitor.

It is another object of this invention to provide a process for incorporating a small amount of carbonaceous material into a dielectric oxide layer on an aluminum anode.

It is a further object of this invention to provide a modified dielectric oxide layer which is resistant to hydration. By using a conventional boric acid/borate electrolyte containing a minor amount of an alpha- or ortho- hydroxy carboxylic compound, it is possible to obtain superior dielectric oxide films, modified by incorporation of a minor amount of carbonaceous material which protects the dielectric oxide from further hydration.

It has been found that when aluminum foil with a fine etch structure (desirable for the purpose of increasing the surface area and hence increasing capacitance per unit of capacitor volume) is anodized in a conventional boric acid formation electrolyte containing $5 \times 10^{-5}$ to $1.5 \times 10^{-2}$ mole/liter of an alpha- or ortho- hydroxy carboxylic acid or salt, the film produced contains a small amount of a carbonaceous material and is resistant to hydration. While neither the exact species or even fragment incorporated nor the mechanism of incorporation and hydration-resistance are known it is known from radiotracer studies that the carbon of the —COOH group(s) is involved.

BRIEF DESCRIPTION OF THE DRAWING

The drawing shows a capacitance section 10 in partly unrolled condition. Anode 11 is aluminum having on its surface the modified oxide layer of the present invention. Cathode 12 may be aluminum or another metal. Electrolyte absorbent films 13 and 14, e.g. of kraft paper, are positioned between the anode and cathode. Tabs 15 and 16 of aluminum are connected to electrodes 11 and 12 respectively as terminals for the section 10.

DESCRIPTION OF THE PREFERRED EMBODIMENTS

In the first two examples, results from radiotracer studies shows the amount of carbon contained in the modified films. Surface adsorption was negligible.

EXAMPLE 1

The carboxylic carbon in disodium tartrate was labelled with $C^{14}$. Etched aluminum foil was anodized to 200v in a 1% boric acid bath containing 0.0013M tartrate at 25° C. and 5ma/cm$^2$ current density. After anodization, the foil was rinsed, and the dielectric oxide film was found to contain 0.35% C.

EXAMPLE 2

The carboxylic carbon in calcium gluconate was labelled with $C^{14}$. Etched aluminum foil was anodized to 400v in a 1% boric acid bath containing 0.0028M calcium gluconate at 25° C. and 1 ma/cm$^2$ current density. After anodization the foil was rinsed, and the dielectric oxide film was found to contain 0.22% C.

EXAMPLE 3

Finely etched high voltage aluminum foil was anodized in an electrolytic bath at 600v and 90° C. for 4 min. or until current density had decreased to 2 ma/cm$^2$. The electrolyte consisted of a solution of boric acid (10 g/l) and 0.0017M sodium citrate. When anodization was complete, the foil was rinsed and assembled as a capacitor with 2 mil cathode foil and a 1.2 mil manila paper separator. A glycol-borate electrolyte was used. The capacitance was at least 10% higher and the equivalent series resistance 25% lower than that of films formed in a conventional boric acid electrolyte.

Practical considerations dictate that the lower additive limit be set at $5\times10^{-5}$ M, while more than $1.2\times10^{-2}$M concentrations have produced films with impared properties. These concentrations correspond to less than 1% carbonaceous material in the film. Experience has shown that 1% or more carbonaceous material does not give films of improved properties.

Table I presents tests for hydration resistance of foils of the present invention. Compounds 1, 2, 4, 5, 7, 10 and 11 are examples of the alpha- or ortho- hydroxycarboxylic compounds. Compounds 3, 6 and 8 are analogous nonhydroxy compounds, and compound 9 contains the hydroxy group in the meta- rather than ortho-position. Compound 12, borax, is included for comparison as a conventional electrolyte. The first data column lists the original capacitance; the second, that of film treated with boiling water. As was mentioned above, hydration converts dielectric oxide to a porous material which decreases the thickness of the effective dielectric oxide layer and increases capacitance. The fourth column presents the amount of reformation charge needed to restore the film to its original condition, a measure of the amount of conversion of the barrier oxide to the hydrated form. The films were formed at constant current to 400v; hydration was effected by immersing the films in boiling water for 30 min. The films were reformed to the original 400v.

Table I

| Additive | Original Capacitance $\mu f/cm^2 \times 10^2$ | Hydrated Capacitance $\mu f/cm^2 \times 10^2$ | Ratio of Hydrated:Orig. Capacitance | Reformation Charge coulombs/ $cm^2 \times 10^3$ |
|---|---|---|---|---|
| 1. sodium tartrate | 1.9 | 2.4 | 1.3 | 8 |
| 2. sodium malate | 1.9 | 2.4 | 1.5 | 18 |
| 3. sodium succinate | 1.9 | 19.0 | 10 | 114 |
| 4. sodium gluconate | 1.9 | 8.0 | 4.2 | 88 |
| 5. calcium gluconate | 1.9 | 5.2 | 2.7 | 58 |
| sodium caproate | 2.0 | 175 | 88 | 128 |
| 7. sodium salicylate | 1.8 | 3.4 | 1.9 | 30 |
| 8. sodium benzoate | 1.9 | 35 | 18 | 144 |
| 9. sodium m-hydroxybenzoate | 1.9 | 47 | 25 | 192 |
| 10. sodium tartronate | 1.9 | 2.1 | 1.1 | 2 |
| 11. ammonium citrate | 2.0 | 4.4 | 2.2 | 34 |
| 12. borax | 2.0 | 9.3 | 4.7 | 94 |

As shown above, the compounds which contain an alpha- or ortho- hydroxy group are more effective than non-hydroxy compounds or compounds in which the hydroxy is not in the alpha- or ortho-position. Furthermore, the former class is more effective than borax alone which in turn is more effective than the latter class of compounds.

What is claimed is:

1. A process for producing an aluminum electrolytic capacitor anode having thereon a dielectric barrier oxide layer modified by the incorporation therein of no more than 1% of carbonaceous material calculated as carbon, including the step of producing said modified barrier layer by carrying out the usual anodization step on etched foil in a conventional boric acid electrolyte containing $5\times10^{-5}$ to $1.5\times10^{-2}$ mols/liter of an additive chosen from the group consisting of alpha- and ortho- hydroxycarboxylic acids containing two through seven carbon atoms and salts of these acids, thus producing said layer modified by the incorporation therein of no more than 1% carbonaceous material calculated as carbon, and subsequently processing the anode in the usual manner and assembling it in an electrolytic capacitor.

2. A process according to claim 1 wherein the additive is a compound, soluble in the electrolyte, chosen from the group consisting of tartaric, malic, gluconic, salicylic, tartronic, citric and alpha- hydroxycaproic acids and salts thereof.

3. A process according to claim 1 wherein the conventional boric acid formation electrolyte containing said additive additionally contains a borate salt.

4. A process according to claim 2 wherein the additive is a tartrate.

5. A process according to claim 2 wherein the additive is a malate.

6. A process according to claim 1 wherein the additive is a citrate.

7. A process according to claim 2 wherein the additive is a salicylate.

8. A process according to claim 1 wherein the additive is a tartronate.

9. A process according to claim 2 wherein the additive is an alpha- hydroxycaproate.

* * * * *